United States Patent [19]

Hartmann

[11] Patent Number: 4,976,119
[45] Date of Patent: Dec. 11, 1990

[54] PISTON-TYPE APPARATUS FOR EXPRESSING WATER FROM LAUNDRY

[75] Inventor: Egon Hartmann, Schellerten, Fed. Rep. of Germany

[73] Assignee: Senkingwerke GmbH & Co., Hildesheim, Fed. Rep. of Germany

[21] Appl. No.: 563,921

[22] Filed: Dec. 21, 1983

[30] Foreign Application Priority Data

Dec. 22, 1982 [DE] Fed. Rep. of Germany ....... 3247468
Apr. 9, 1983 [DE] Fed. Rep. of Germany ....... 3312808

[51] Int. Cl.$^5$ ............................................. D06F 47/04
[52] U.S. Cl. ......................................... 68/242; 68/21; 68/210; 100/116; 100/211
[58] Field of Search ...................... 68/21, 96, 210, 241, 68/242; 100/116, 211, 240, 241, 252, 295, 53, 49; 83/61, 63, 399; 192/125, 126, 129 A, 116.5, 134; 72/3, 4

[56] References Cited

U.S. PATENT DOCUMENTS

| | | | |
|---|---|---|---|
| 1,905,099 | 4/1933 | Jay | 83/63 X |
| 2,050,484 | 8/1936 | Burry | 68/242 |
| 2,466,630 | 4/1949 | Yandell et al. | 68/241 |
| 3,016,005 | 1/1962 | Tomka et al. | 100/48 |
| 3,103,270 | 9/1963 | Tilbury | 192/134 X |
| 3,160,045 | 12/1964 | Newgard | 83/63 |
| 3,602,136 | 8/1971 | Ligh | 100/295 X |
| 3,765,283 | 10/1973 | Murphy, II | 83/63 X |
| 3,786,976 | 1/1974 | Murphy, II | 83/63 X |
| 4,121,512 | 10/1978 | Valdespino | 100/116 X |
| 4,148,597 | 4/1979 | Larsen | 100/211 X |
| 4,171,735 | 10/1979 | Zuhlke et al. | 100/53 X |
| 4,172,415 | 10/1979 | Baltschun | 100/53 |
| 4,195,722 | 4/1980 | Anderson et al. | 100/53 X |
| 4,249,400 | 2/1981 | Arendt | 68/242 |
| 4,260,492 | 4/1981 | Ito et al. | 100/211 X |
| 4,316,372 | 2/1982 | Veil | 83/63 X |
| 4,423,674 | 1/1984 | Thies | 100/295 X |
| 4,485,508 | 12/1984 | Otting | |
| 4,489,578 | 12/1984 | Nagai et al. | 192/129 A X |

FOREIGN PATENT DOCUMENTS

| | | | |
|---|---|---|---|
| 509390 | 3/1952 | Belgium | 68/242 |
| 519980 | 3/1953 | Belgium . | |
| 538368 | 11/1931 | Fed. Rep. of Germany . | |
| 853897 | 10/1952 | Fed. Rep. of Germany | 68/241 |
| 870239 | 3/1953 | Fed. Rep. of Germany | 68/241 |
| 893186 | 10/1953 | Fed. Rep. of Germany . | |
| 1030296 | 3/1958 | Fed. Rep. of Germany . | |
| 1051782 | 3/1959 | Fed. Rep. of Germany | 68/241 |
| 37848 | 1/1970 | Japan | 100/295 |

OTHER PUBLICATIONS

European Patent Application; 051,721; Germany; Senkingwerk, 8/26/81.

*Primary Examiner*—Frankie L. Stinson
*Attorney, Agent, or Firm*—Herbert Dubno; Andrew Wilford

[57] ABSTRACT

An apparatus for expressing liquid from a load of laundry has an upwardly open vessel having upright side walls and a floor and adapted to contain the load to be dewatered. Liquid can be drained from this vessel and a piston is vertically displaceable into and out of the vessel toward and away from the floor thereof. A relatively soft cushion is carried on the piston and has a downwardly concave lower face engageable against the laundry load on the vessel floor. The piston can be displaced vertically between an upper position with the lower face above and outside the vessel and a lower position with the lower face pressing the load against the vessel floor. The cushion has an outwardly concave side surface. The cushion can be hollow and filled with a liquid. In addition it is so soft that when compressed with a pressure of 20 bar to 30 bar it is of generally half the volume it has when at ambient pressure.

5 Claims, 2 Drawing Sheets

PISTON-TYPE APPARATUS FOR EXPRESSING WATER FROM LAUNDRY

FIELD OF THE INVENTION

The present invention relates to an apparatus for extracting water from wet laundry and the like. More particularly this invention concerns a piston-type water-expressing apparatus.

BACKGROUND OF THE INVENTION

In order to avoid the damage that a wringer can do to laundry, and the difficulties of properly distributing the load in a centrifugally acting extractor, it is known to express the water from a load of laundry by means of a piston-type machine. Such an apparatus in a single operation compresses the load of laundry, physically forcing the liquid from it.

In one such apparatus the laundry is loaded into an upwardly open vessel whose lower wall is perforated and connected to a drain. A piston can slide down inside the chamber and compress the load against the floor, thereby expressing the water from it. Such an apparatus is difficult to load and unload, and does not subject all the load to the same amount of compression. Thus bulkier parts of the load are compressed more, and more liquid is expressed from them, than less bulky parts.

A partial solution to this problem is described in U.S. Pat. No. 1,985,485. This apparatus has a spherical chamber which can be closed around the load of laundry. The floor of the chamber is perforated and provided with a drain and the upper chamber wall is flexible and can be forced piston-fashion down against the load of a laundry sitting on the bottom wall to express the liquid from it. Such an apparatus does indeed subject the entire load to a uniform pressure, but is fairly complex. The membrane can be damaged by sharp objects in the laundry, and it is necessary to provide complicated locking devices to hold the chamber closed when the compartment above the membrane is inflated. In addition this arrangement must be manually loaded and unloaded, so it is only usable in a labor-intensive laundry-processing operation.

In order to protect the membrane it is known to overlie the load of laundry with a thick blanket that is of some tough and flexible material that prevents sharp objects in the load being dewatered from piercing the membrane. Such an overlay transfers much of the downwardly effective force into outwardly effective force on the side walls of the laundry-holding vessel, requiring corresponding sturdy construction of these parts. A secondary piston can be used, in order to exert the 20 bar to 30 bar of pressure needed to express the liquid from the laundry but even so drying is often fairly uneven and the device is subject to considerable wear, so its service life is short.

OBJECTS OF THE INVENTION

It is therefore an object of the present invention to provide an improved apparatus for expressing liquid from a load of laundry.

Another object is the provision of such a apparatus for expressing liquid from a load of laundry or the like which overcomes the above-given disadvantages, that is which uniformly dewaters the laundry while being of simple and rugged construction.

SUMMARY OF THE INVENTION

An apparatus for expressing liquid from a load of laundry according to the invention has an upwardly open vessel having upright side walls and a floor and adapted to contain the load to be dewatered. Liquid can be drained from this vessel and a piston is vertically displaceable into and out of the vessel toward and away from the floor thereof. A relatively soft cushion is carried on the piston and has a downwardly concave lower face engageable against the laundry load on the vessel floor. The piston can be displaced vertically between an upper position with the lower face above and outside the vessel and a lower position with the lower face pressing the load against the vessel floor.

With this system, therefore, the piston will not damage the laundry, and will uniformly dewater it. The soft cushion will allow relatively large pressures to be brought to bear, without however these forces being concentrated at one location to damage an item in the wash.

According to this invention the cushion has an outwardly concave side surface. Thus rubbing contact between the cushion and the side walls is minimized. This effect is maximized when the cushion and side walls is minimized. This effect is maximized when the cushion and side walls are annular and shaped as surfaces of revolution centered on a common vertical axis.

In accordance with a further feature of the present invention the cushion is hollow and filled with a liquid. Such a cushion ensures the the dewatering force will be uniformly distributed over the entire surface of the load being treated.

In addition according to the invention the cushion is so soft that when compressed with a pressure of 20 bar to 30 bar it is of generally half the volume it has when at ambient pressure. Moreover the volume of the cushion at ambient pressure is at least as great as that of the cushion plus the load of laundry when compressed with a pressure of 20 bar to 30 bar. The cushion is of progressively decreasing compressibility, that is as it is compressed it offers increasing resistance to further compression.

The apparatus of this invention also has means including a sensor at the upper edge of the side wall and connected to the actuator means for inhibiting downward displacement of the piston when the load of laundry projects beyond the side-wall upper edge. This sensor is normally constituted as an electrical contact, as the laundry is invariably conductive. Thus current flow between the sensor and the floor of the vessel serves to indicate the presence of the load of laundry.

In addition the system of this invention has means for displacing the side walls vertically independently of the floor. A horizontally effective ram can push the laundry off the floor when the side walls are lifted, at the end of a dewatering operation.

DESCRIPTION OF THE DRAWING

The above and other features and advantages will become more readily apparent from the following, reference being made to the accompanying drawing in which.

SPECIFIC DESCRIPTION

Figure 1:
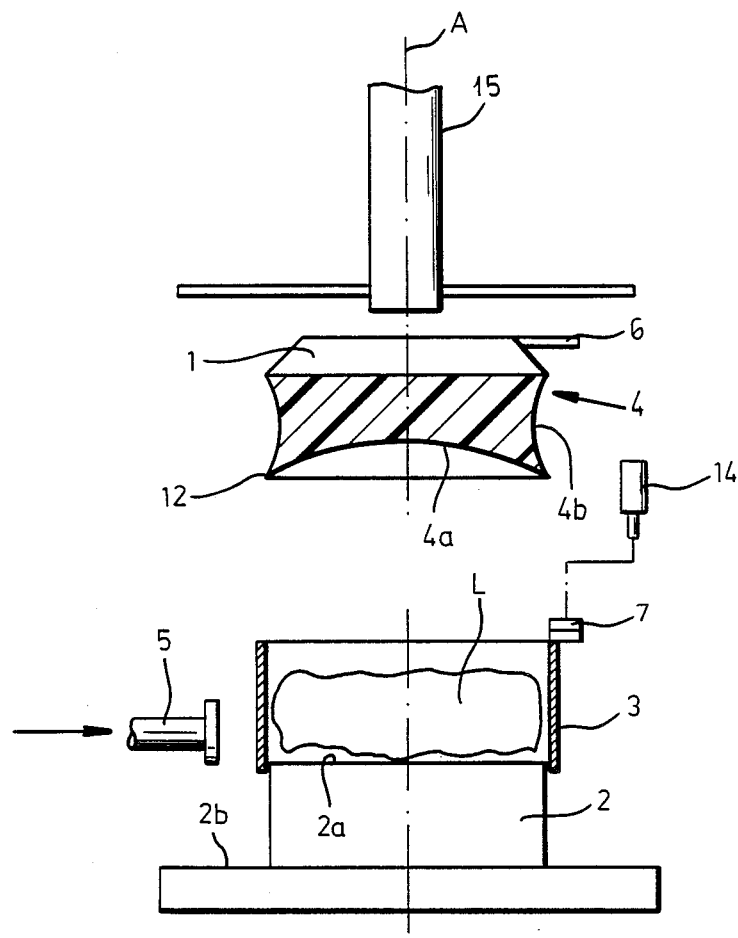
FIG. 1 is a partly schematic vertical section through the apparatus of this invention.

As seen in FIG. 1 a load L of laundry to be dewatered, normally contained in a mesh bag, is held on a vessel formed by a floor plug 2 fitting with slight play in a cylindrical sleeve 3, both centered on an axis A. A piston 1 can be displaced axially by an actuator 15 and carries on its lower surface a cushion 4 formed of a closed-cell polyurethane foam and having a part-spherical downwardly concave lower surface 4a and an outwardly concave hyperboloidal outer surface 4b centered like the surface 4a on the axis A. The surfaces 4a and 4b together form a sharp-edge lip 12. The piston 1 carries a laterally projecting abutment 6 and the sleeve 3 carries another such abutment 7 engageable therewith. An actuator 14 is provided for displacing the sleeve 3 along the axis A, and an unloading ram 5 can move radially across the planar top surface 2a of the plug 2.

After the load L is charged into the vessel 2, 3 the actuator 15 moves the piston 1 and its cushion 4 axially downward into engagement with the load L, and simultaneously engages the abutments 6 and 7 with each other. The actuator 15 continues to press the piston 1 downward with a pressure of 20 bar to 30 bar, thereby pushing the sleeve 3 down until it abuts a shoulder 2b of the plug 2. The volume of the load L and softness of the cushion 4 are such that at this extreme lower end position the volume of the cushion 4 is reduced by about half. Obviously this action compresses the load L so that most of the water therein runs out at the crack between the edge of the plug 2 and the sleeve 3. Since the outer surface 4b is concave there is minimal rubbing of the cushion 4 on the sleeve 2, and since the lower surface 4a is similarly concave it efficiently confines the load L.

Once the load L has been thus dewatered the actuator 14 pushes the sleeve 3 back up and the actuator 15 raises the piston 1 slightly so the ram 5 can push the load L off the plug 2. The ram 5 is then retracted, the sleeve 3 lowered, and the piston 1 lifted again so another cycle can start.

Figure 2:
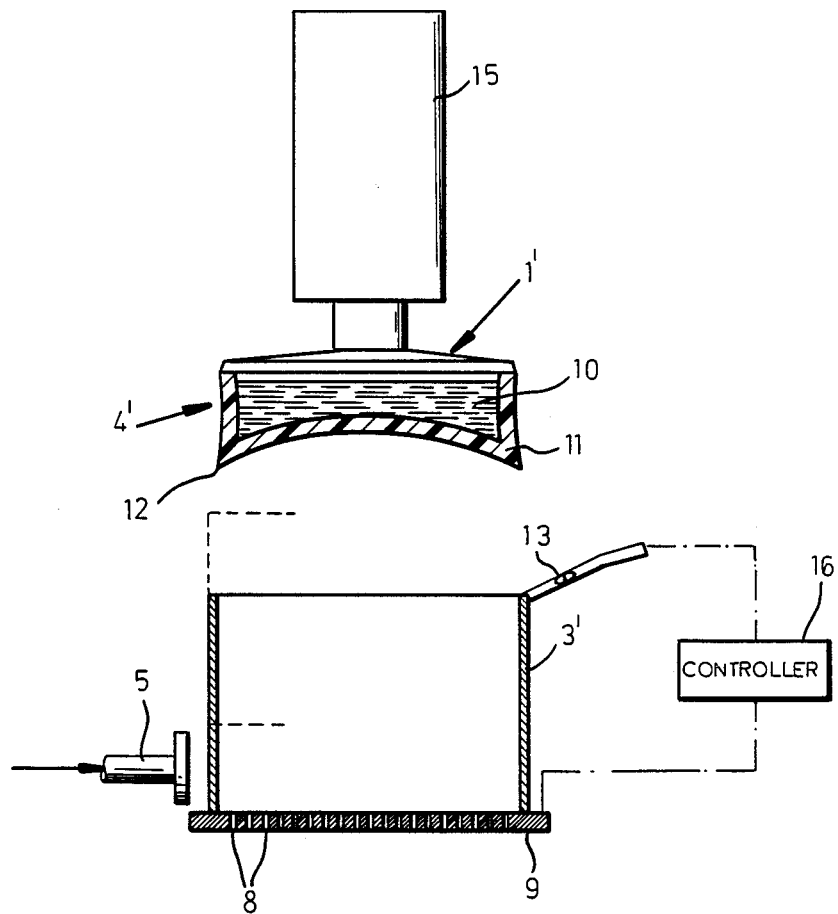
FIG. 2 is a view like FIG. 1 through another apparatus according to the present invention.

In FIG. 2 a cushion 4' of a piston 1' is of the same shape as the cushion 4, but is formed of a flexible but somewhat stiff outer skin 11 filled with a body 10 of water. In this arrangement the vessel is formed by a cylindrical sleeve 3' that can move axially vertically above a floor plate 9 formed with drain perforations 8.

A sensor 13, which is normally mounted in the sleeve 3' in an insulated bushing , is connected to a controller 16 also connected to the plate 9. This sensor 13 can sense the presence or absence of laundry at its level at the upper edge of the sleeve 3', and the controller 16 can prevent the actuator 15 from operating when the vessel formed by the sleeve 3' and the plate, 9 is too full, and this sensor 13 can also detect when the system is being loaded.

The controller 16 therefore works with the sensor 13 to detect the presence of something to be dewatered before an expressing operation, and to detect when the system is empty thereafter, to permit another cycle to start. The controller 16 normally just measures any possible current flow between the sensor 13 and the base plate 9 to detect such presence or absence of laundry, which is invariably wet and conductive.

I claim:

1. An apparatus for expressing liquid from a load of laundry, the apparatus comprising:
   an upwardly open vessel having upright side walls and a floor and adapted to contain the load to be dewatered;
   means including perforations in the floor for draining liquid from the vessel;
   a piston above and vertically displaceable into and out of the vessel toward and away from the floor thereof and having a lower surface vertically confronting the floor of the vessel;
   a relatively soft hollow cushion carried on the lower surface of the piston having a flexible and stiff skin forming a downwardly concave lower wall engageable against the laundry load on the vessel floor and a flexible and outwardly concave side wall of the same shape seen from above as the side walls of the vessel, the side and lower wall of the cushion together forming a sharp-edged lip;
   a body of liquid filling the skin and below the lower surface of the piston;
   actuating means connected to the piston for displacing same vertically between an upper position with the lower wall of the cushion above and outside the vessel and a lower position with the lower wall of the cushion pressing the load against the vessel floor and with the side wall of the cushion closely juxtaposed with the side walls of the vessel, the lip riding on the side wall of the vessel as the piston is displaced between its positions; and
   means including a sensor having an electrical contact at the upper edge of the side wall of the vessel and connected to the actuator means for inhibiting downward displacement of the piston when the load of laundry projects beyond the side-wall upper edge.

2. The liquid-expressing apparatus defined in claim 1 wherein the side walls are annular and shaped as surfaces of revolution centered on a common vertical axis.

3. The liquid-expressing apparatus defined in claim 2 wherein the side walls of the vessel are cylindrical and the side wall of the cushion is hyperboloidal.

4. The liquid-expressing apparatus defined in claim 1, further comprising
   means for displacing the side walls of the vessel vertically independently of the floor.

5. The liquid-expressing apparatus defined in claim 4, further comprising
   means for pushing the load horizontally off the floor.

* * * * *